United States Patent [19]

Goetze

[11] Patent Number: 5,403,153
[45] Date of Patent: Apr. 4, 1995

[54] HOLLOW COMPOSITE TURBINE BLADE

[75] Inventor: Raymond H. Goetze, Clifton Park, N.Y.

[73] Assignee: The United States of America as represented by the Secretary of the Air Force, Washington, D.C.

[21] Appl. No.: 145,899

[22] Filed: Oct. 29, 1993

[51] Int. Cl.⁶ .............................................. F01D 5/14
[52] U.S. Cl. .............................. 416/229 A; 416/230; 416/248
[58] Field of Search .......... 416/223 A, 223 R, 229 A, 416/229 R, 230, 231 B, 232, 248

[56] References Cited

U.S. PATENT DOCUMENTS

| | | | |
|---|---|---|---|
| 4,343,593 | 8/1982 | Harris | 416/230 |
| 4,524,499 | 6/1985 | Grimes et al. | 416/230 |
| 4,589,176 | 5/1986 | Rosman et al. | 416/230 |
| 4,648,921 | 3/1987 | Nutter, Jr. | 416/230 |
| 4,929,154 | 5/1990 | Wildner | 416/230 |
| 5,013,216 | 5/1991 | Bailey et al. | 416/230 |
| 5,022,824 | 6/1991 | Violette | 416/230 |

FOREIGN PATENT DOCUMENTS 1268202 3/1972 United Kingdom ................ 416/230

*Primary Examiner*—John T. Kwon
*Attorney, Agent, or Firm*—Thomas C. Stover; Stanton E. Collier; Jacob N. Erlich

[57] ABSTRACT

The invention provides a woven composite lightweight turbine blade in which, e.g. ceramic or carbon fibers are woven around a foam core in the airfoil section of the blade and around a removable mandrel in the dovetail section of the blade, and braided at the tip and root thereof to define a woven blade pre-form. An infiltrant of e.g. phenolic, carbon or ceramic is added to the woven pre-form, which is then pyrolized to provide a thermally stable matrix in the pre-form and define a composite woven blade therewith. The resulting blade has a cavity in the air foil section between the tip and root sections of the blade and a hollow dovetail section. The dovetail section has reinforcing carbon or ceramic fibers mounted across the resulting passageway through the dovetail, which fibers are cooled by air passing through such dovetail passage such that the dovetail acts as a heat exchanger for the so-formed woven composite blade. The so cavitied woven composite blade has the dual advantage of a) being lightweight and b) having the heat exchange passage noted above.

8 Claims, 2 Drawing Sheets

HOLLOW COMPOSITE TURBINE BLADE

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a composite turbine blade, particularly a hollow fibered turbine blade.

2. The Prior Art

Prior Art non-metallic composite turbine blades are, in general, of the un-cooled solid type. See for example U.S. Pat. No. 5,018,271 to Bailey et al (1991). The high thermal conductivities of this class of materials requires complicated solutions to heat transferred from the flow path around the blade into the supporting blade rotor and disc structure. These design solutions are complex and add additional weight to the blade and supporting disc structure.

Although such solid non-metallic composite turbine blades are lightweight compared to current metallic blade designs, more coolable, lighter-in-weight blades are desirable to overcome the above prior art shortcomings.

There has now been discovered a composite turbine blade that is lighter in weight and more readily cooled than previously available in the prior art.

SUMMARY OF THE INVENTION

Broadly the present invention provides a composite lightweight turbine blade comprising a cavitied woven fiber structure infiltrated with a thermally stable matrix, which blade has a solid tip section and a solid root section with a cavitied air foil section therebetween.

In the preferred embodiment, the composite blade of the invention has a hollow dovetail section mounted below the above root section.

In a further preferred embodiment, the above composite blade is reinforced with durable wound, woven and/or braided fibers therein.

BRIEF DESCRIPTION OF THE DRAWINGS

The invention will become apparent from the following detailed specification and drawings in which.

DESCRIPTION OF PREFERRED EMBODIMENTS

Figure 1:
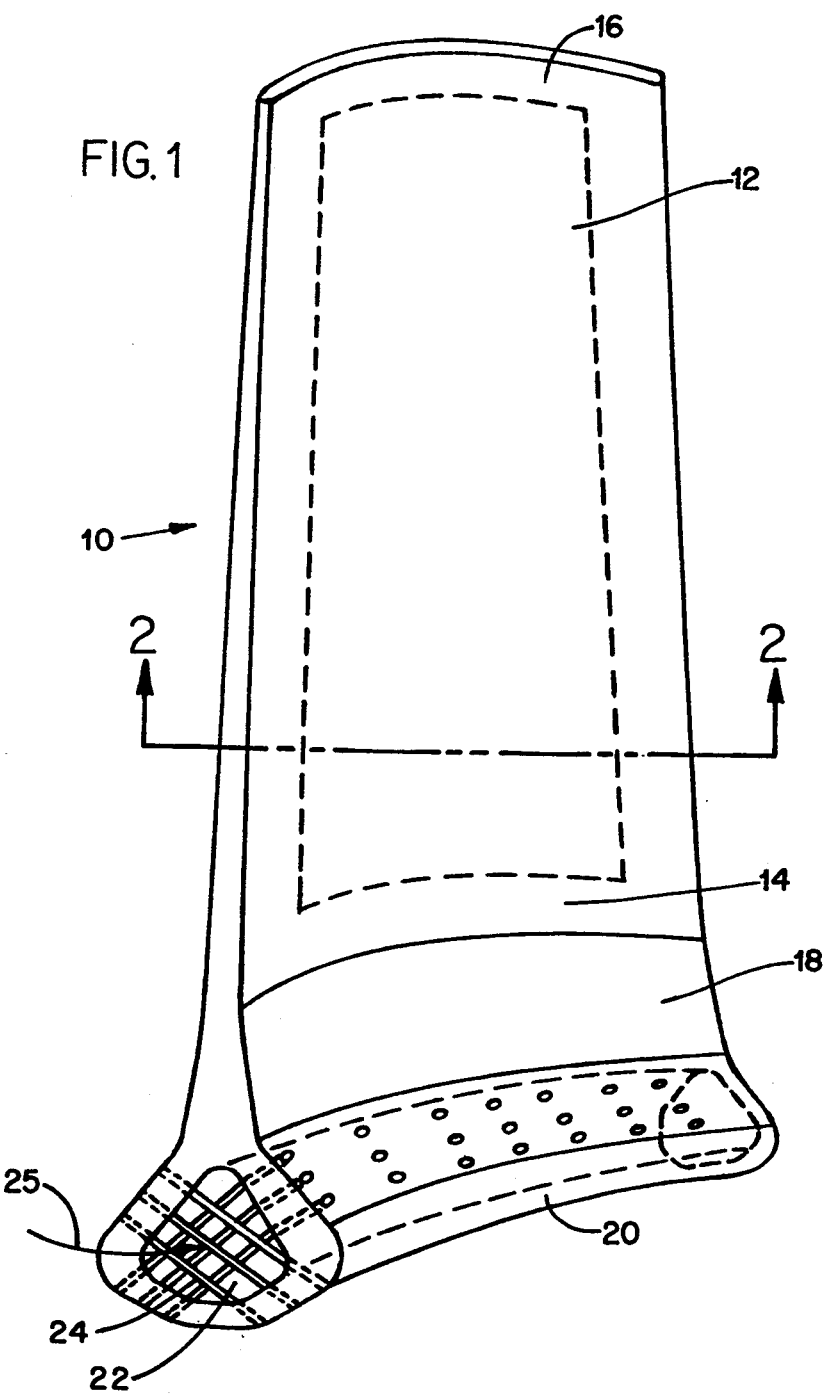
FIG. 1 is a perspective schematic view of the composite turbine blade of the invention.

Referring now to the drawings in more detail, the composite turbine blade 10 of the invention, is constructed of durable fiber, woven and/or braided in a desired configuration. Examples of weaving and braiding techniques in making solid turbine engine blades are given in the above cited prior art patent to Bailey et al, which disclosure is incorporated herein by reference.

Various weaving and braiding techniques in preparing gas turbine engine blades are known in the art and will not be re-disclosed here.

Figure 2:
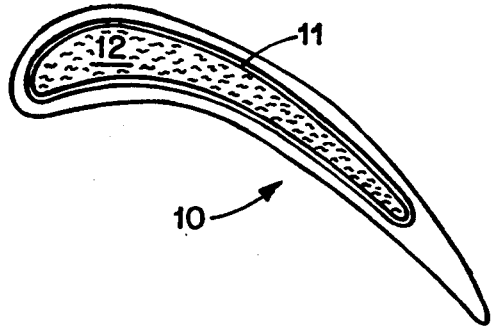
FIG. 2 is a cross-sectional view of the blade of FIG. 1, taken on line 2—2, looking in the direction of the arrows.

Referring again to FIG. 1 hereof and to FIG. 2, the fiber architecture employed in weaving the turbine blade 10 is of a three-dimensional braided type. A carbon or ceramic foam core 12, machined to the internal blade cavity shape is used as a mandrel to braid the air foil shape around. The core 12, (which preferably has a protective ceramic coating 11 thereon) is encapsulated into the air foil shape between the blade root 14 and tip 16, where solid air foil cross-sections are braided. The shank section 18 of the blade 10 is also braided as a solid cross-section.

The dovetail section of the blade 10 is braided over a mandrel which results in a hollow passage 22 therethrough as shown in FIG. 1. The mandrel is made of a material which can be removed, either prior to blade consolidation or after blade completion. This hollow cavity or passage 22 permits the flow of cooling air through the dovetail to reduce the surface temperature thereof and the conduction of heat into the blade (and disc) support structure.

The dovetail passage 22 has reinforcement fibers 24 across such passage to prevent the collapse of the dovetail during operation of the blade 10 in a gas turbine engine, as shown or indicated in FIG. 1. As indicated by arrow 25, cooling air is directed through the passage 22 for cooling the dovetail 20 as indicated in FIG. 1. The reinforcing fibers 24 across the passage 22, act as tube heat exchanges with the incoming cooling air (per arrow 25) to convect heat out of the dovetail region. The number of fibers filling the passage is dependent upon structural and heat transfer requirements for the blade design.

The blade cavities defined by foam core 12, shown in FIGS. 1 and 2 and dovetail passage 22, shown in FIG. 1, also serve to reduce overall blade weight. The placement and orientation of fibers in the composite blade design can provide blade designs not possible with current metallic blade structures.

Figure 3:
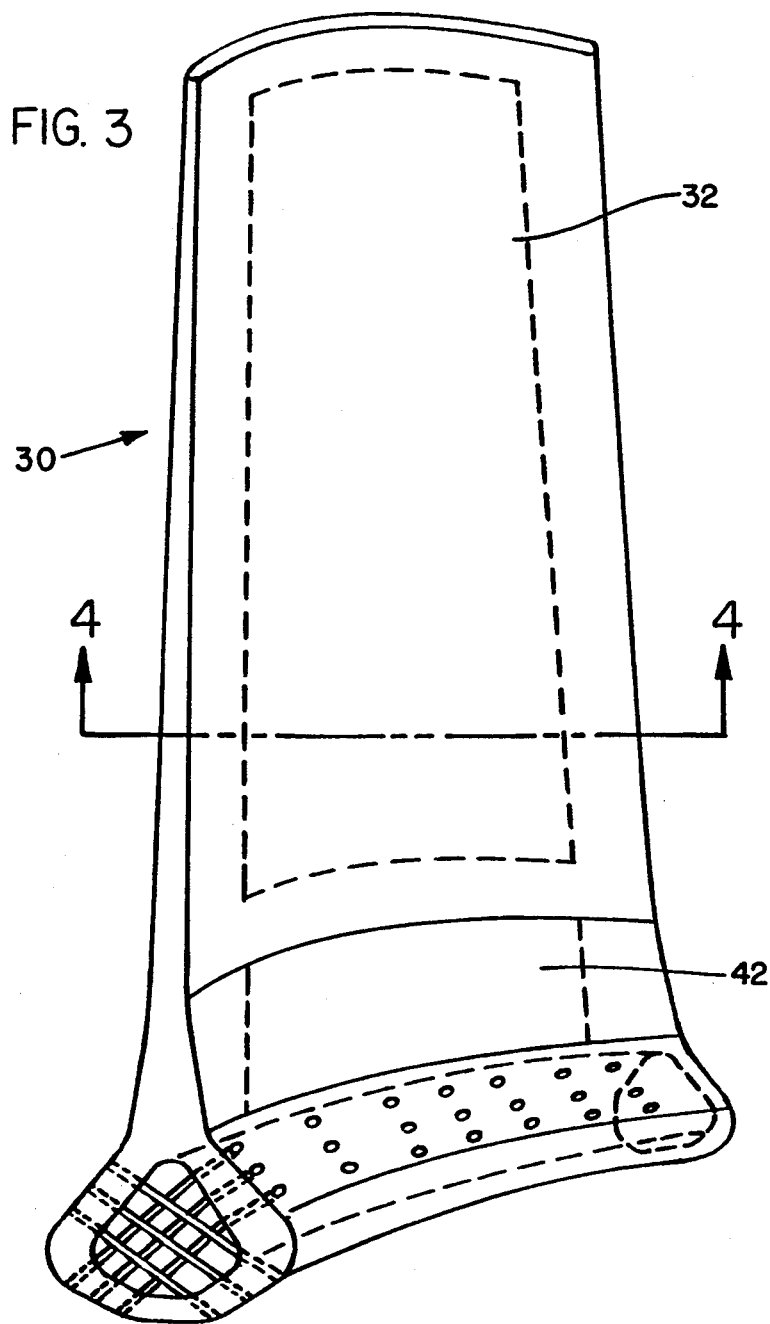
FIG. 3 is a perspective schematic view of another embodiment of the composite turbine blade of the invention and FIG. 4 is a cross-sectional view of the blade of the FIG. 3, taken on line 4—4, looking in the direction of the arrows.
Figure 4:
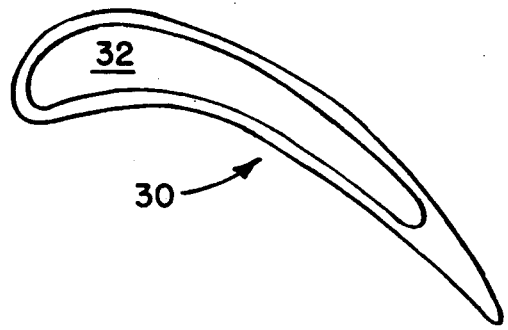

In another embodiment, woven turbine blade 30, shown in FIGS. 3 and 4, is similar to the blade shown in FIGS. 1 and 2, except that the form core 12, shown in FIGS. 1 and 2, is replaced by a gas-filled cavity 32, shown in FIGS. 3 and 4 and a hollow shank portion 42 has been added to the turbine blade 30, as shown in FIG. 3.

As indicated above, the hollow woven composite blade of the invention is desirably woven and braided around cores or removable mandrels, to obtain a desired blade shape. Thereafter the walls of such woven blade (and not the cavities) are infiltrated with heat stable materials, e.g. ceramic carbon-ceramic or carbon-carbon composite.

The type of infiltrant will depend upon the intended use and temperature requirements of the blade. For example, for relatively low temperature use of such blades in fans or compressors, such woven blades are suitably infiltrated with phenolics or other plastics. For high temperature use, such blades are infiltrated with, e.g. a carbon-carbon matrix, using several infiltration steps. For higher temperature use, such woven blade is desirably infiltrated with, e.g. a ceramic matrix, such as silicon carbide or silicon nitride. The types of infiltrants are known in the art and will not be re-disclosed here as the invention lies in the design of the composite woven blade having one or more cavities therein.

One can machine the so infiltrated blade to take, e.g. 10 mils off the surface thereof to lower or remove high spots or burrs therefrom. In the case of low temperature operation of the composite blade, there may be no need of such machining. In the case of the middle temperature range of blade use, an oxidation coating can be applied to the carbon-carbon woven fiber composite blade and in the case of the high temperature use, it's optional whether one provide a coating to the ceramic composite woven fiber blade or not, depending upon operating conditions.

The invention thus provides a composite gas turbine engine blade including a 3D braided fiber pre-form infiltrated with a matrix material around mandrels, cores or other fiber shaping inserts and shaped to form a 3D braided and woven air foil with braided root, shank and dovetail and having one or more cavities therein for cooling and weight saving purposes.

The fibers employed are known in the art and disclosed e.g. in the above cited Bailey et al patent, incorporated herein by reference, which fibers include carbon fibers and/or ceramic fibers which are woven around a core or mandrel into a blade shape as noted above. These fibers are preferably 5 to 10 microns in diameter or can be of greater or lesser diameter depending upon operating conditions and design requirements.

Thus the above non-metallic, composite woven turbine blade design accelerates the pursuit of (IHPTET) industry goals to significantly increase thrust-to-weight ratios and decrease specific fuel consumption rates.

The superior strength of fiber reinforced composites combined with innovative manufacturing techniques, makes it feasible to design hollow blades which reduce the overall weight of the blade, e.g. per FIGS. 1 and 2. In addition the one or more cavities of such composite blade can often be used as cooling passages which allows the blades to be run in a temperature environment above the normal usable temperature limit of the composite material.

In addition, the conduction of heat from the engine flow path down into the disc support structure, can be significantly reduced by the passage of cooling air through the dovetail heat exchanger (e.g. nos. 20-25 of FIG. 1) mounted to such disc support structure.

Thus the cavitied woven composite blade design of the invention can significantly reduce the heat load transferred from the turbine blade to the disc support structure and maintain the required structural integrity thereof during engine operation.

Alternatives

Other fiber architectures in addition to braids can be employed in the composite woven blade of the invention. Laminates and other 3-dimensional fiber architectures, such as angle interlock or other braid types are possible with the cavitied woven composite blade of the present invention.

The shank section of the blade design can be hollow also. This allows a woven composite blade design that can be cooled by air passing through the entire blade.

Different types of dovetail reinforcing fibers are possible within the present invention. Thus ceramic monofiliments or pultruded carbon fiber bundles can be used to reinforce the hollow dovetail structure, e.g. passage 22 of dovetail 20, shown in FIG. 1. Further, the absence of reinforcing fibers (or fiber bundles) from apertures intentionally left in the dovetail, provide other paths by which cooling air can be used to cool the blade dovetail or supporting disc structure as an alternative design of the present invention.

Also, the airfoil above the dovetail of the invention can have a lightweight foam core of ceramic or carbon or an air or other gas core thereof as desired per the invention.

The above infiltrants, once infiltrated into the woven fiber pre-form are then pyrolyzed at 800° to 1000° C. to solidify same into a reinforcing matrix for such woven fiber and define the woven cavity microcomposite airfoil of the invention.

Also, it is not always necessary to pass cooling air through the dovetail passage of the airfoil of the invention and such airfoil can be used solely to produce a lighter weight composite blade, as desired within the scope of the invention.

What is claimed is:

1. A woven composite lightweight turbine blade comprising
   a) walls infiltrated with a thermal stable matrix,
   b) a solid tip section,
   c) a solid root section,
   d) an air foil section in said structure situated between said tip section and said root section, said air foil section having at least one cavity therein,
   e) a hollow dovetail section and
   f) a shank section mounted between and connecting to said dovetail section and said root section.

2. The composite blade of claim 1 wherein said shank section is solid.

3. The composite blade of claim 1 wherein said shank section is hollow.

4. The composite blade of claim 1 wherein said dovetail has a passage therethrough and reinforcing fibers mounted across said passage in the path of cooling air.

5. The composite blade of claim 1 wherein said airfoil section has a carbon or ceramic foam core mounted in said cavity.

6. The composite blade of claim 5 wherein the walls of said cavity have a ceramic coating thereon to protect said foam core.

7. The composite blade of claim 1 wherein the airfoil cavity is filled with gas including air therein.

8. The composite blade of claim 1 wherein said dovetail has apertures therein for ventilation and heat exchange purposes.

* * * * *